Nov. 21, 1944. R. MATTEUCCI 2,363,257
YIELDABLE COUPLING
Filed March 17, 1941 2 Sheets-Sheet 1

Inventor:
R. MATTEUCCI
By Albert Holcombe
Attorney.

Nov. 21, 1944.  R. MATTEUCCI  2,363,257
YIELDABLE COUPLING
Filed March 17, 1941  2 Sheets-Sheet 2

Inventor:
R. MATTEUCCI
By
Attorney.

Patented Nov. 21, 1944

2,363,257

UNITED STATES PATENT OFFICE 2,363,257

YIELDABLE COUPLING

Raffaele Matteucci, Turin, Italy; vested in the Alien Property Custodian

Application March 17, 1941, Serial No. 383,882 In Italy March 16, 1940

2 Claims. (Cl. 64—15)

(Granted under the provisions of sec. 14, act of March 2, 1927; 357 O. G. 5)

The present invention relates to improvements in elastic couplings for shafts substantially in alignment in which the entrainment occurs by means of elastic elements radiating from a sleeve coaxial with the driving and driven members and angularly independent therefrom, to which sleeve these elements are tied by their inside end, while by means of their outside end the elements engage the driving member and the driven member. In these couplings the elastic elements of each couple while leaning on a common fulcrum-bar interposed and arranged at an intermediate point of their length and subjected to the action strain developed by the driving member and to the reaction strain developed by the driven member, are stressed to deflection on said fulcrum in conditions of a free elastic deformation on their whole length and elastically transmit the torque between said members.

In known couplings the length of the two sections in which the total length of the single elastic elements is divided by the fulcrum remains constant during functioning.

The improvements according to the present invention mainly relate to a particular conformation of the conjugated surfaces of contact of the elastic elements and the interposed bar, owing to which conformation the fulcrum constituted by the line of contact of the elements with the bar is displaced in the radial direction with the changing of the deflection of the elastic elements. Owing to such a disposition the length of the two sections in which the total length of the elastic element is divided by the fulcrum, is continually changing with the fluctuation of the moment transmitted by the coupling and consequently the flexibility of the elastic element and therefor of the whole coupling is continually changing. Furthermore also the fundamental oscillatory frequency possessed by the elastic complex is continually changing, thus a coupling is realised, which is elastic and anti-harmonic.

A form of realisation of an elastic coupling thus improved is shown by way of example in the accompanying drawings, in which:

Fig. 1 shows the coupling in an axial section and

Fig. 2 in cross section according to the line 2x—2x of Fig. 1;

Figure 1:
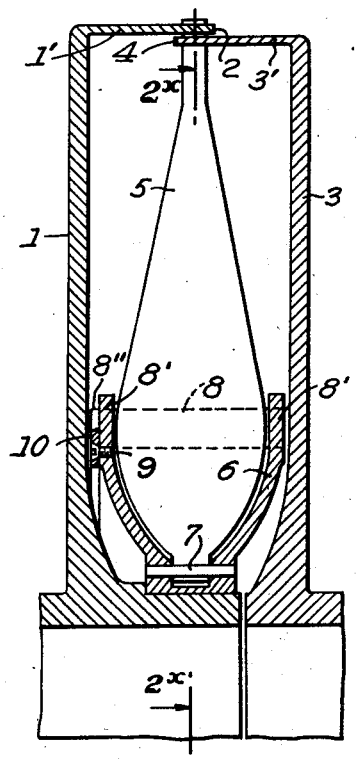
Figure 2:
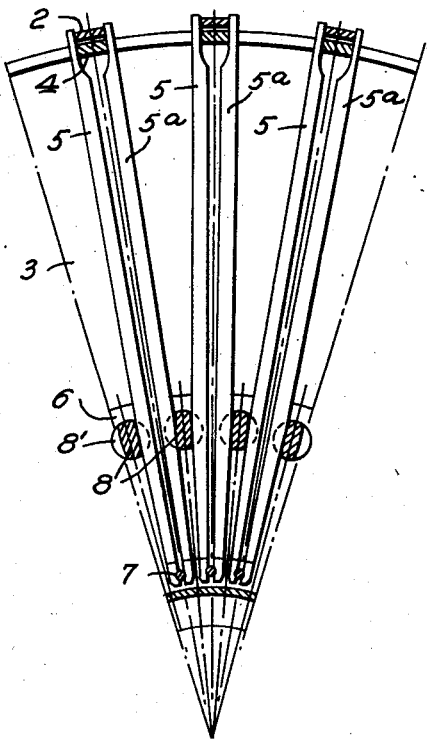

With reference to Figures 1 and 2 of the drawings, 1 and 3 are the coaxial discs of the coupling, one being the driving and the other the driven member. Reference numbers 2 and 4 are teeth axially directed provided on the perimetrical band 1' and 3' of the discs to be engaged by the ends of the external portions of two elastic elements 5, 5ª such as leaf springs. The elastic elements 5, 5ª are projected star-like from a sleeve 6, independent from the driving and driven members, within which they are arranged with their internal portion and to which they are tied against the action of the centrifugal force by means of pins 7. These elastic elements 5 and 5ª are preferably shaped as elements of uniform resistance to deflection having, for instance, a constant thickness in their portion outside the sleeve 6 and linearly decreasing thickness in their internal portion while one of their faces is flat the other comprises two surfaces, the one parallel to the first face and the other slightly inclined with respect to the same.

The sleeve 6 is provided with a plurality of circumferentially spaced bars 8. Each bar serves as a fulcrum for one of the elastic elements and the bars are mounted on the sleeve 6 so as to be parallel to the axis of the coupling. Each bar 8 is relatively thin and one bar is arranged between each pair of elastic elements. The bars 8 all have an appreciable radial dimension for the purpose of providing a fulcrum which may be radially displaced by changes in the flexure of the leaf springs. A cylindrical-shaped flange 8' is provided at each end of the bars 8 and these flanges are arranged in openings 6' in the end walls of the sleeve.

Figure 8:
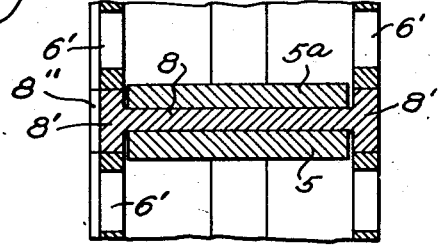
Fig. 8 is a horizontal section according to the line 8x—8x of Fig. 7.

When the elements 5, 5ª are adjusted in their place, the bars 8 cannot be drawn out from said engaging seats on the sleeve as it clearly appears in Fig. 8. Furthermore said bars 8 are preferably blocked against rotation. A practically and simple means for this purpose consists in providing one of the flanges 8' with a semi-cylindric projection 8'' protruding from one of the sides of the sleeve, and the substantially flat sides of these projections 8'' are engaged by the periphery of a ring 10 which is secured to the sleeve member 6 by means of screws 9.

Figure 5:
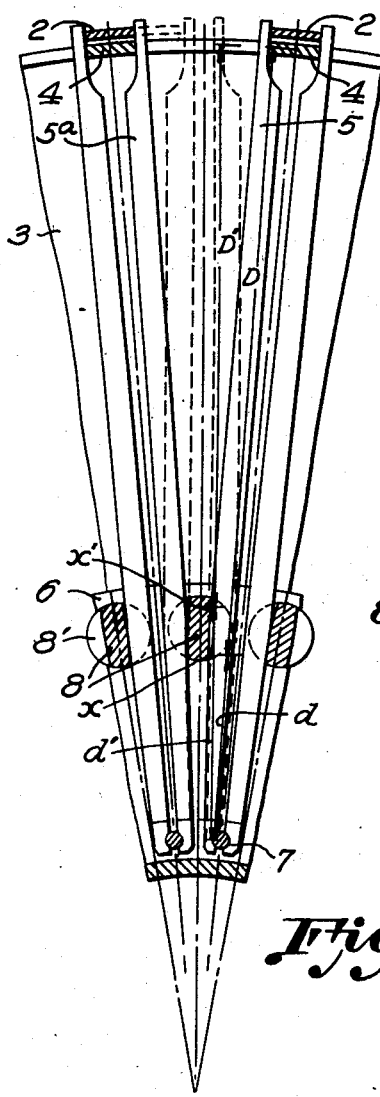
Fig. 5 is a cross section of the coupling illustrating its functioning.
Figure 6:
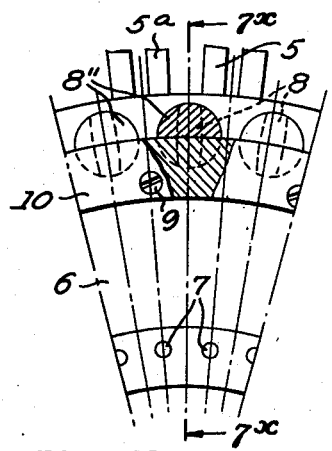
Fig. 6 shows in side elevation, partially sectioned, a portion of the sleeve with some elastic elements.
Figure 7:
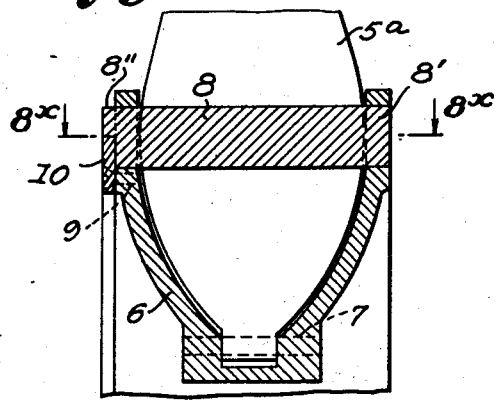
Fig. 7 is a cross section according to the line 7x—7x of Fig. 6.

In Fig. 5, the flat faces of the elastic elements 5 and 5ª bear on the convex surface of the fulcrum-bar 8 the profile of which in section is an arc of a circle. When, as shown at full lines, the coupling does not transmit any load, the fulcrum is formed in $x$; but when there is a strain deforming the elastic elements as shown to dotted lines, the fulcrum is displaced in $x'$, so that the length of the two sections $d$ and $D$ into which the fulcrum divides the length of the elastic element is modified. It is then evident that the coefficient of flexibility of this coupling varies with the change of the load and consequently also the frequency of the oscillations of the elastic elements and consequently that of the whole coupling varies accordingly, while in the known couplings in which the fulcrum of each couple has a fixed radial distance the frequency of said oscillations is invariable. It is known that if the elastic coupling is placed on a point of the axis line where one of the occuring torsional vibrations presents a node, such a torsional vibration produces here an oscillatory fluctuation of the moment of torsion so that if the elastic coupling is of the known type, that is with fulcrums at a fixed radial distance and its invariable oscillatory frequency coincides with that of the oscillatory impulsions due to the torsional vibration a critical state is produced owing to resonance.

According to the present coupling with fulcrums at fluctuating radial points, the oscillatory frequency of the coupling changes automatically with the variation of the load and consequently such a resonance is efficiently precluded.

Figure 4:
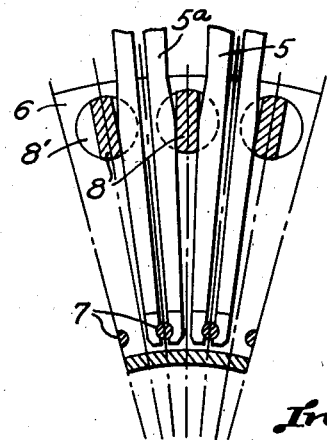

The fluctuating displacement of the fulcrum can be also obtained by making flat the surface of the fulcrum-bar 8 with the cooperating face of the elastic element being curved as shown in the modification of Fig. 4 or also by providing both these surfaces with convenient curvatures.

Figure 3:
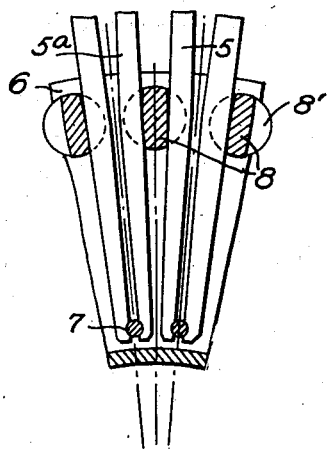
Figures 3-4 show in cross section some changes in the conformation of the conjugated surfaces of contact between the elastic element and the fulcrum.

The opposite faces of the bars 8 may be arcuate-shaped cooperating with flat faced leaf springs as shown in Fig. 3.

It is clear, that the present invention is not limited to the exact dispositions specified and illustrated, but without departing from its principle it may be subjected to all the changes required by circumstances or to the exigencies which according to practice appear to be necessary or advantageous.

What I claim is:

1. In an elastic coupling for connecting a driving member and a driven member, the combination of a sleeve rotatable relative to said members and mounted co-axially of said members; a plurality of leaf springs extending radially from said sleeve and having their inner ends fixed in said sleeve, the opposite ends of alternate springs bearing against the driving member, and the opposite ends of the remaining springs bearing against the driven member; and a plurality of abutments mounted on said sleeve, each abutment having two convex surfaces, the arcs of curvature of said surfaces being on a radius much greater than the diameter of the abutment, each convex surface being in contact with one of said springs intermediate its ends.

2. In an elastic coupling for connecting a driving member and a driven member, the combination of a sleeve rotatable relative to said members and mounted co-axially of said members; a plurality of pairs of leaf springs extending radially from said sleeve and having their inner ends fixed in said sleeve, one of the springs of each pair having its opposite end bearing against said driving member, and the other spring of each pair having its opposite end bearing against the driven member; and a pin, quadrilateral in cross-section, mounted on said sleeve between each pair of springs intermediate their ends, and having two of its sides slightly curved which bear against the adjacent springs of the adjacent pairs, respectively.

RAFFAELE MATTEUCCI.